United States Patent
Ostermann et al.

(10) Patent No.: US 8,086,751 B1
(45) Date of Patent: *Dec. 27, 2011

(54) SYSTEM AND METHOD FOR RECEIVING MULTI-MEDIA MESSAGES

(75) Inventors: Joern Ostermann, Morganville, NJ (US); Mehmet Reha Civanlar, Middletown, NJ (US)

(73) Assignee: AT&T Intellectual Property II, L.P, Atlanta, GA (US)

( * ) Notice: Subject to any disclaimer, the term of this patent is extended or adjusted under 35 U.S.C. 154(b) by 1263 days.

This patent is subject to a terminal disclaimer.

(21) Appl. No.: 11/679,911

(22) Filed: Feb. 28, 2007

Related U.S. Application Data

(63) Continuation of application No. 11/212,267, filed on Aug. 27, 2005, now Pat. No. 7,203,759, which is a continuation of application No. 10/003,091, filed on Nov. 2, 2001, now Pat. No. 6,976,082.

(60) Provisional application No. 60/245,521, filed on Nov. 3, 2000.

(51) Int. Cl.
G06F 15/16 (2006.01)

(52) U.S. Cl. .......... 709/231; 709/246; 709/206

(58) Field of Classification Search .......... 709/231, 709/246–247, 203, 206–207; 706/270, 275, 706/260

See application file for complete search history.

(56) References Cited

U.S. PATENT DOCUMENTS

| | | | |
|---|---|---|---|
| 4,276,570 A | 6/1981 | Burson et al. |
| 4,602,280 A | 7/1986 | Maloomian |
| 5,113,493 A | 5/1992 | Crosby |
| 5,347,306 A | 9/1994 | Nitta |
| 5,387,178 A | 2/1995 | Moses |
| 5,416,899 A | 5/1995 | Poggio et al. |
| 5,420,801 A | 5/1995 | Dockter et al. |
| 5,537,662 A | 7/1996 | Sato et al. |
| 5,546,500 A | 8/1996 | Lyberg |
| 5,555,343 A | 9/1996 | Luther |
| 5,555,426 A | 9/1996 | Johnson et al. |
| 5,613,056 A | 3/1997 | Gasper et al. |
| 5,630,017 A | 5/1997 | Gasper et al. |
| 5,638,502 A | 6/1997 | Murata |
| 5,640,590 A | 6/1997 | Luther |
| 5,647,834 A | 7/1997 | Ron |
| 5,657,426 A | 8/1997 | Waters et al. |
| 5,659,692 A | 8/1997 | Poggio et al. |
| 5,680,481 A | 10/1997 | Prasad et al. |

(Continued)

FOREIGN PATENT DOCUMENTS

EP 849691 A2 6/1998

(Continued)

OTHER PUBLICATIONS

Decarlo et al,"An anthropometric face model using variational techniques", In Proc. of 25th Annl Conf. on Computer Graphics & interactive Tech.Siggraph 98, ACM Press, NY,67-74.

(Continued)

*Primary Examiner* — Abdullahi Salad

(57) ABSTRACT

A system and method of delivering a multi-media message to a recipient is disclosed. The multi-media message is created by a sender and contains a talking entity for delivering a sender message. A determination is made as to whether the recipient device has rendering software for delivering a video portion of the multi-media message. If the recipient device does not have the rendering software, the multi-media message is streamed from a server such that a generic rendering software device will deliver the multi-media message.

5 Claims, 9 Drawing Sheets

U.S. PATENT DOCUMENTS

| | | | |
|---|---|---|---|
| 5,689,618 A | 11/1997 | Gasper et al. | |
| 5,697,789 A | 12/1997 | Sameth et al. | |
| 5,732,232 A | 3/1998 | Brush et al. | |
| 5,745,360 A | 4/1998 | Leone et al. | |
| 5,774,170 A | 6/1998 | Hite et al. | |
| 5,781,186 A | 7/1998 | Jennings | |
| 5,818,461 A | 10/1998 | Rouet et al. | |
| 5,826,234 A | 10/1998 | Lyberg | |
| 5,832,115 A | 11/1998 | Rosenberg | |
| 5,848,396 A | 12/1998 | Gerace | |
| 5,850,463 A | 12/1998 | Horii | |
| 5,852,669 A | 12/1998 | Eleftheriadis et al. | |
| 5,857,099 A | 1/1999 | Mitchell et al. | |
| 5,860,064 A | 1/1999 | Henton | |
| 5,880,731 A | 3/1999 | Liles et al. | |
| 5,889,892 A | 3/1999 | Saito | |
| 5,933,151 A | 8/1999 | Jayant et al. | |
| 5,936,628 A | 8/1999 | Kitamura et al. | |
| 5,950,163 A | 9/1999 | Matsumoto | |
| 5,963,217 A | 10/1999 | Grayson | |
| 5,969,721 A | 10/1999 | Chen et al. | |
| 5,970,173 A | 10/1999 | Lee et al. | |
| 5,970,453 A | 10/1999 | Sharman | |
| 5,982,853 A | 11/1999 | Liebermann | |
| 5,983,190 A | 11/1999 | Trower et al. | |
| 5,995,119 A | 11/1999 | Cosatto et al. | |
| 5,995,639 A | 11/1999 | Kado et al. | |
| 6,002,997 A | 12/1999 | Tou | |
| 6,011,537 A | 1/2000 | Slotznick | |
| 6,014,634 A | 1/2000 | Scroggie et al. | |
| 6,014,689 A | 1/2000 | Budge et al. | |
| 6,018,744 A | 1/2000 | Mamiya et al. | |
| 6,018,774 A | 1/2000 | Mayle et al. | |
| 6,044,248 A | 3/2000 | Mochizuki et al. | |
| 6,064,383 A | 5/2000 | Skelly | |
| 6,068,183 A | 5/2000 | Freeman et al. | |
| 6,069,622 A | 5/2000 | Kurlander | |
| 6,075,857 A | 6/2000 | Doss et al. | |
| 6,075,905 A | 6/2000 | Herman et al. | |
| 6,078,700 A | 6/2000 | Sarachik | |
| 6,088,040 A | 7/2000 | Oda et al. | |
| 6,111,590 A | 8/2000 | Boezeman et al. | |
| 6,122,177 A | 9/2000 | Kitano | |
| 6,122,606 A | 9/2000 | Johnson | |
| 6,147,692 A | 11/2000 | Shaw et al. | |
| 6,161,082 A | 12/2000 | Goldberg et al. | |
| 6,166,744 A | 12/2000 | Jaszlics et al. | |
| 6,173,250 B1 | 1/2001 | Jong | |
| 6,195,631 B1 | 2/2001 | Alshawi et al. | |
| 6,208,359 B1 | 3/2001 | Yamamoto | |
| 6,215,505 B1 | 4/2001 | Minami et al. | |
| 6,219,638 B1 | 4/2001 | Padmanabhan et al. | |
| 6,225,978 B1 | 5/2001 | McNeil | |
| 6,230,111 B1 | 5/2001 | Mizokawa | |
| 6,232,966 B1 | 5/2001 | Kurlander | |
| 6,233,544 B1 | 5/2001 | Alshawi | |
| 6,243,681 B1 | 6/2001 | Guji et al. | |
| 6,289,085 B1 | 9/2001 | Miyashita et al. | |
| 6,307,567 B1 | 10/2001 | Cohen-Or | |
| 6,324,511 B1 | 11/2001 | Kiraly et al. | |
| 6,329,994 B1 | 12/2001 | Gever et al. | |
| 6,332,038 B1 | 12/2001 | Funayama et al. | |
| 6,343,141 B1 | 1/2002 | Okada et al. | |
| 6,366,286 B1 | 4/2002 | Hermanson | |
| 6,366,949 B1 | 4/2002 | Hubert | |
| 6,377,925 B1 | 4/2002 | Greene et al. | |
| 6,381,346 B1 | 4/2002 | Erasian | |
| 6,384,829 B1 | 5/2002 | Prevost et al. | |
| 6,385,586 B1 | 5/2002 | Dietz | |
| 6,393,107 B1 * | 5/2002 | Ball et al. | 379/88.13 |
| 6,405,225 B1 | 6/2002 | Apfel et al. | |
| 6,417,853 B1 | 7/2002 | Squires et al. | |
| 6,433,784 B1 | 8/2002 | Merrick et al. | |
| 6,434,597 B1 | 8/2002 | Hachiya et al. | |
| 6,449,634 B1 | 9/2002 | Capiel | |
| 6,453,294 B1 | 9/2002 | Dutta et al. | |
| 6,460,075 B2 | 10/2002 | Krueger et al. | |
| 6,462,742 B1 | 10/2002 | Rose et al. | |
| 6,466,205 B2 | 10/2002 | Simpson et al. | |
| 6,466,213 B2 | 10/2002 | Bickmore et al. | |
| 6,476,815 B1 | 11/2002 | Ando | |
| 6,496,868 B2 | 12/2002 | Krueger et al. | |
| 6,522,333 B1 | 2/2003 | Hatlelid et al. | |
| 6,532,011 B1 | 3/2003 | Francini et al. | |
| 6,535,907 B1 | 3/2003 | Hachiya et al. | |
| 6,539,354 B1 | 3/2003 | Sutton et al. | |
| 6,542,936 B1 | 4/2003 | Mayle et al. | |
| 6,545,682 B1 | 4/2003 | Ventrella et al. | |
| 6,553,341 B1 | 4/2003 | Mullaly et al. | |
| 6,606,096 B2 | 8/2003 | Wang | |
| 6,631,399 B1 | 10/2003 | Stanczak et al. | |
| 6,643,385 B1 | 11/2003 | Bravomalo | |
| 6,654,018 B1 | 11/2003 | Cosatto et al. | |
| 6,661,418 B1 | 12/2003 | McMillan et al. | |
| 6,665,860 B1 | 12/2003 | DeSantis et al. | |
| 6,680,934 B1 | 1/2004 | Cain | |
| 6,692,359 B1 | 2/2004 | Williams et al. | |
| 6,766,299 B1 | 7/2004 | Bellomo et al. | |
| 6,778,958 B1 | 8/2004 | Nishimura et al. | |
| 6,782,431 B1 | 8/2004 | Mukherjee et al. | |
| 6,784,901 B1 | 8/2004 | Harvey et al. | |
| 6,801,931 B1 * | 10/2004 | Ramesh et al. | 709/206 |
| 6,833,845 B2 | 12/2004 | Kitagawa et al. | |
| 6,919,892 B1 | 7/2005 | Cheiky et al. | |
| 6,963,839 B1 | 11/2005 | Ostermann et al. | |
| 6,965,926 B1 | 11/2005 | Shapiro et al. | |
| 6,975,988 B1 | 12/2005 | Roth et al. | |
| 6,976,082 B1 | 12/2005 | Ostermann et al. | |
| 6,987,535 B1 | 1/2006 | Matsugu et al. | |
| 6,990,452 B1 | 1/2006 | Ostermann et al. | |
| 7,035,803 B1 | 4/2006 | Ostermann et al. | |
| 7,091,976 B1 | 8/2006 | Ostermann et al. | |
| 7,174,295 B1 | 2/2007 | Kivimaki | |
| 7,177,811 B1 | 2/2007 | Ostermann et al. | |
| 7,203,648 B1 | 4/2007 | Ostermann et al. | |
| 7,203,759 B1 | 4/2007 | Ostermann et al. | |
| 7,237,251 B1 | 6/2007 | Oz et al. | |
| 7,587,338 B2 | 9/2009 | Owa | |
| 7,865,394 B1 | 1/2011 | Calloway et al. | |
| 2001/0019330 A1 | 9/2001 | Bickmore et al. | |
| 2001/0047384 A1 * | 11/2001 | Croy | 709/203 |
| 2001/0049596 A1 | 12/2001 | Lavine et al. | |
| 2001/0050681 A1 | 12/2001 | Keys et al. | |
| 2001/0050689 A1 | 12/2001 | Park | |
| 2002/0007276 A1 | 1/2002 | Rosenblatt et al. | |
| 2002/0109680 A1 | 8/2002 | Orbanes et al. | |
| 2002/0176604 A1 | 11/2002 | Shekhar et al. | |
| 2002/0194006 A1 | 12/2002 | Challapali | |
| 2003/0028378 A1 | 2/2003 | August et al. | |
| 2003/0035412 A1 | 2/2003 | Wang et al. | |
| 2003/0046160 A1 | 3/2003 | Paz-Pujalt et al. | |
| 2003/0046348 A1 | 3/2003 | Pinto et al. | |
| 2003/0158734 A1 | 8/2003 | Cruickshank | |
| 2003/0191816 A1 | 10/2003 | Landress et al. | |
| 2003/0208556 A1 * | 11/2003 | Friedman et al. | 709/218 |
| 2004/0018858 A1 | 1/2004 | Nelson | |
| 2004/0091154 A1 | 5/2004 | Cote | |
| 2005/0091305 A1 | 4/2005 | Lange et al. | |
| 2007/0033259 A1 | 2/2007 | Wies et al. | |

FOREIGN PATENT DOCUMENTS

| | | | |
|---|---|---|---|
| EP | 849692 A2 | 6/1998 | |
| EP | 1111883 A2 | 6/2001 | |
| JP | 2003033575 A | 2/2003 | |
| KR | 2002016482 A | 3/2002 | |

OTHER PUBLICATIONS

Jian-Gang Wang et al."Morphology-based front-view facial contour detection", IEEE Int'l Conf on Systems, Man and Cybernetics, vol. 4, Oct. 2000, pp. 2775-2780.

Shinn-Yin Ho et al,"Facial modeling fr. an uncalibrated face image using flexible generic parameterized facial models", IEEE Trans. on Systems, Man, & Cybernetics, Pt B, V.31.

Noh, J. et al,"Expression cloning", In Proc.of 28th Annual Conf. on Computer Graphics and interactive Techniques, SIGGRAPH 01, ACM Press, NY, NY p. 277-288.

Litwinowicz, et al "Animating images with drawings" Proc 21st Annual Conf. on Computer Graphics & interactive Tech. SIGGRAPH 1994, ACM Press, NY, NY 409-412.

Yoo, et al "Concept formation in numeric domains" Proc.1995 ACM 23rd Annual Conf. on Computer Science, ACM Press, NY, NY, 36-41.

E. Cosatto, et al "Photo-realistic Talking-heads from Image Samples", IEEE Transactions on Multimedia, Dept. 2000, vol. 2, issue 3, pp. 152-163.

Stephane Dupont, et al "Audio-Visual Speech Modeling for Continuous Speech Recognition" IEEE Trans. on Multimedia, vol. 2, No. 3, Sep. 2000.

K-S. Lee, et al "TTS Based Very Low Bit Rate Speech Coder", Proc. ICASSP 1999, vol. I, Mar. 1999, pp. 181-184.

R. Sproat, et al "Emu: An E-mail Preprocessor for Text-to-Speech", IEEE Signal Processing Society 1998 Workshop on Multimedia Signal Processing, Dec. 7-9, 1998, Los Angeles, CA, USA.

Mikio Kitai et al "Trends of ASR and TTS Applications in Japan", Proc. of International Workshop on Interactive Voice Technology for Telecommunications Applications (IVTTA96), Sep. 1996.

D. Kurlander, et al "Comic Chat", Proceedings of the $23^{rd}$ Annual Conference on Computer Graphic and Interactive Techniques, Aug. 1996.

Pollack "Happy in the East or Smiling in the West", New York Times, Aug. 12, 1996.

Pelachaud, et al "Generating Facial Expressions for Speech", Cognitive Science, Jan. 3, 1996, vol. 20, No. 1, pp. 1-46.

W. Keith Edwards, "The Design and Implementation of the MONTAGE Multimedia Mail System", Apr. 1991, IEEE Conference Proceedings of TRICOMM '91, pp. 47-57.

Ming Ouhyoung, et al "Web-enabled Speech Driven Facial Animation", Proc. of ICAT'99 (Int'l Conference on Artifical Reality and Tele-existance), pp. 23-28, Dec. 1999, Tokyo, Japan.

H. Noot, et al Chartoon 20.0 Manual, Jan. 31, 2000.

Lijun Yin, et al "MPEG4 face modeling using fiducial points", IEEE; Image Processing, 1997. Proceedings., International Conference on, vol. 1, 26-29. 1997.

Bickmore, et al "Animated Autonomous Personal Representatives", ACM, International Conference on Autonomous Agents, Proceedings of the Second International Conference on Autonomous Agents, pp. 8-15, 1998.

Thorisson, Kristinn R. "ToonFace: A System for Creating and Animating Interactive Cartoon Faces." MIT Media Laboratory Learning and Common Sense Section Technical Report, pp. 96-101, Apr. 1996.

Naka, T., et al., "A compression/decompression method for streaming based humanoid animation", Proceedings of Fourth Symposium on Virtual Reality Modeling Language, Feb. 23-26, 1999, VRML '99, ACM Press, NY, NY, pp. 63-70.

Perlin, K et al., "Improv: a system for scripting interactive actors in virtual worlds", Proceedings of the $23^{rd}$ Annual Conference on Computer Graphics and interactive Techniques, SIGGRAPH '96, ACM Press, NY, NY, pp. 205-216.

Pighin, F., et al., "Synthesizing realistic facial expressions from photographs", Proceedings of the $25^{th}$ Annual Conference on Computer Graphics and interactive Techniques, SIGGRAPH '96, ACM Press, NY, NY, pp. 75-84.

Marks et al., "Fuzzy and extra crisp alternating projection onto convex sets (POCS)", Proceedings IEEE International Conference on Fuzzy Systems, vol. 2, Mar. 20-24, 1995, pp. 427-435 vol. 2.

Zs. Ruttkay, P. ten Hagen, H. Noot, and M. Savenije, Facial animation by synthesis of captured and artificial data, CAPtech '98 proceedings, 1998.

J. Hendrix, et al., "A facial repertoire for avatars", Proceedings of the Workshop "Interacting Agents", Enschede, The Netherlands, 2000, pp. 1-20.

Chua, C; Neumann, U., "A layered approach to deformable modeling and animation", Proceedings of the Fourteenth Conference on Computer Animation, Nov. 7-8, 2001, pp. 184-191.

Business Editors, & High-Tech Writers, "Life F/X Inc. Introduces Strategy for Web Success", Business Wire, New York: Feb. 1, 2000. pp. 1-3.

Ruthkrantz and Wojdel, "A Text Based Talking Face," Lecture Notes in Computer Science, vol. 1902, Jan. 2000, pp. 327-332.

Cruickshank, L. et al., "Facilitating the Evolution of a User Driven Iconotextual Internet Patois," Digital Creativity, vol. 10, No. 2, Jun. 1999, pp. 79-89 (11).

Jorn Ostermann, "Animated Talking Head with Personalized 3d Head Model", 1998, Journal of VLSI Signal Processing 20, pp. 97-105.

Delorie, "Why HTML Mail is Evil", downloaded from the internet, copyright Mar. 1999, pp. 1-7, http:www.delorie.com/listserv/mime.

Bonamico et al., "Virtual Talking Heads for Tele-Education Applications", in Proceedings of SSGRR 2001 Int. Conf. on Advances in Infrastructure for Electronic Business, Science, and Education on the Internet, L'Aquila, Italy, Aug. 2001, pp. 1-8.

\* cited by examiner

FIG. 6

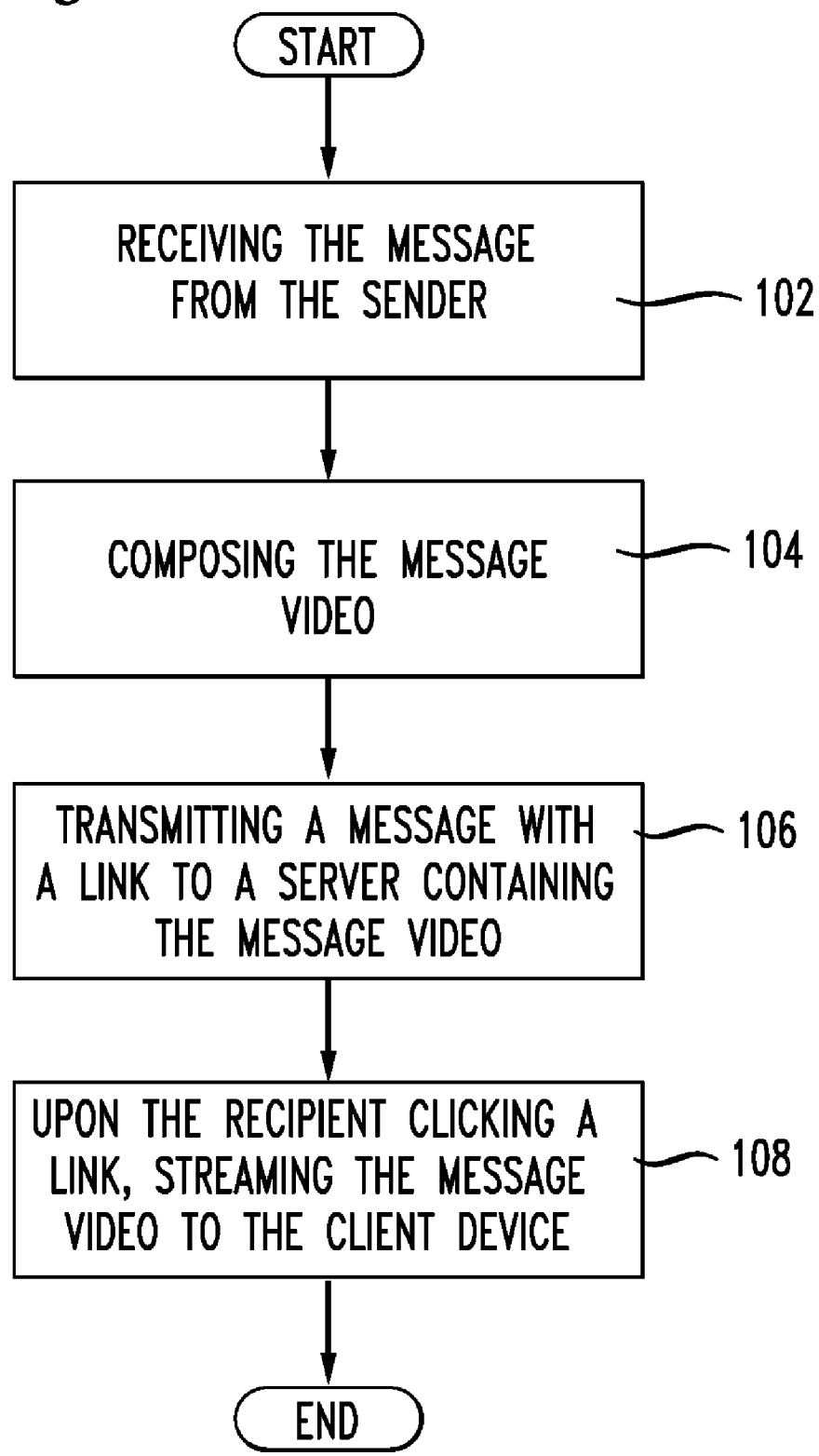

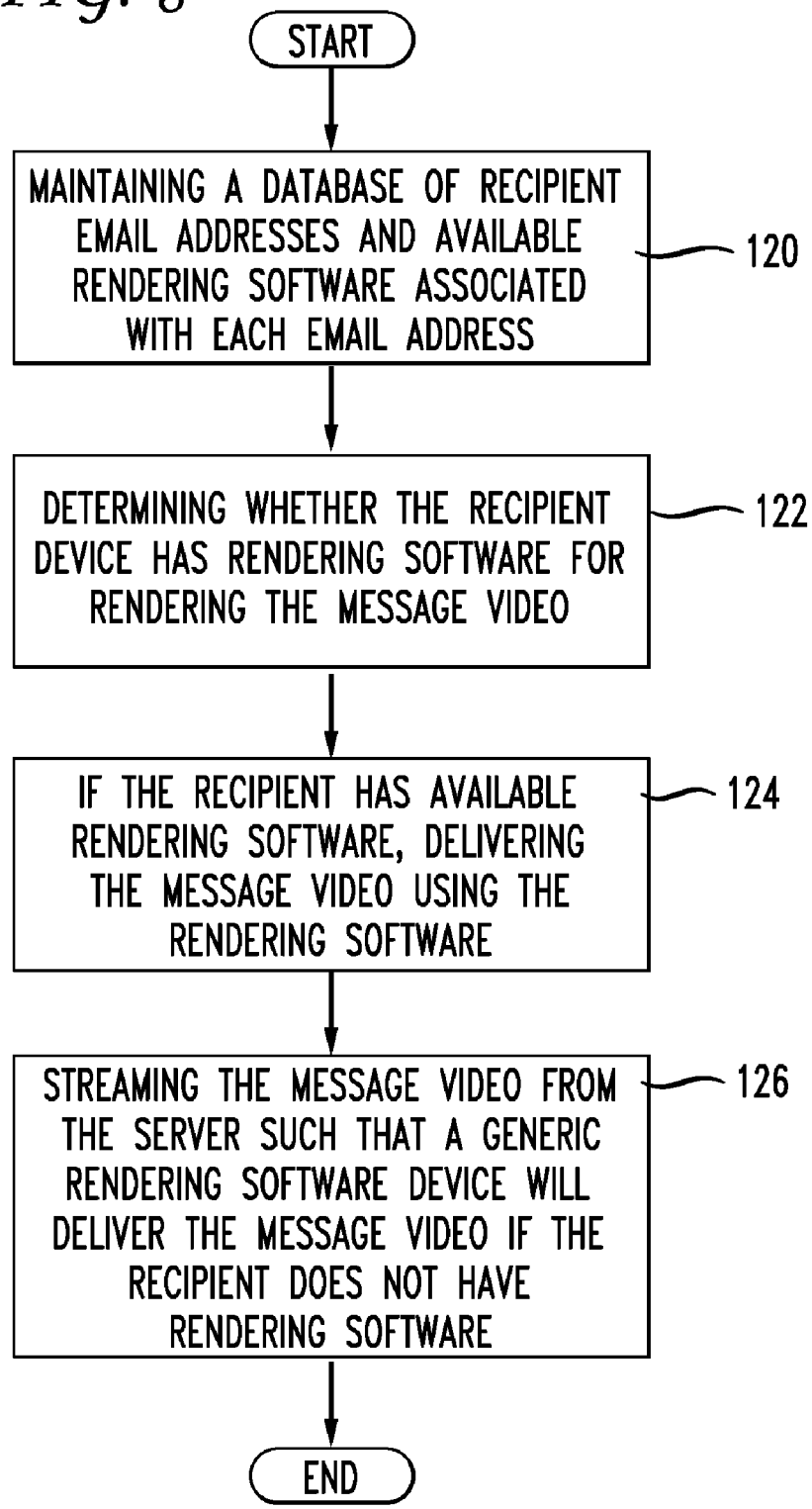

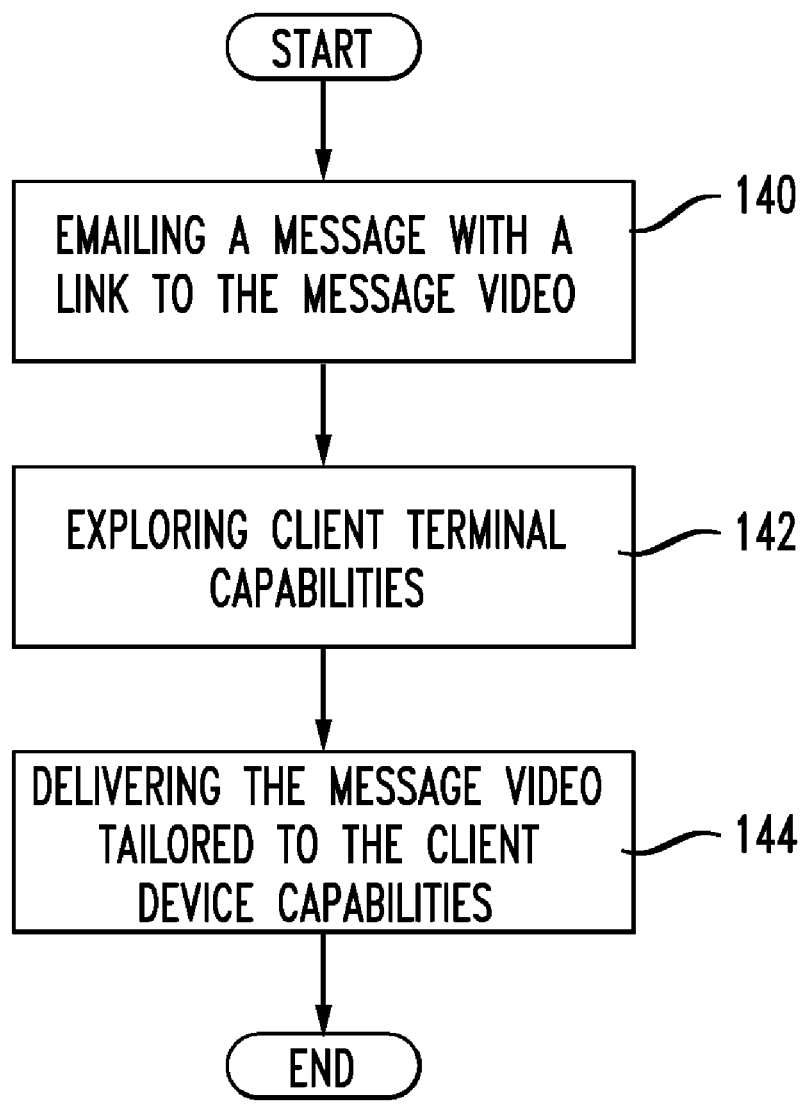

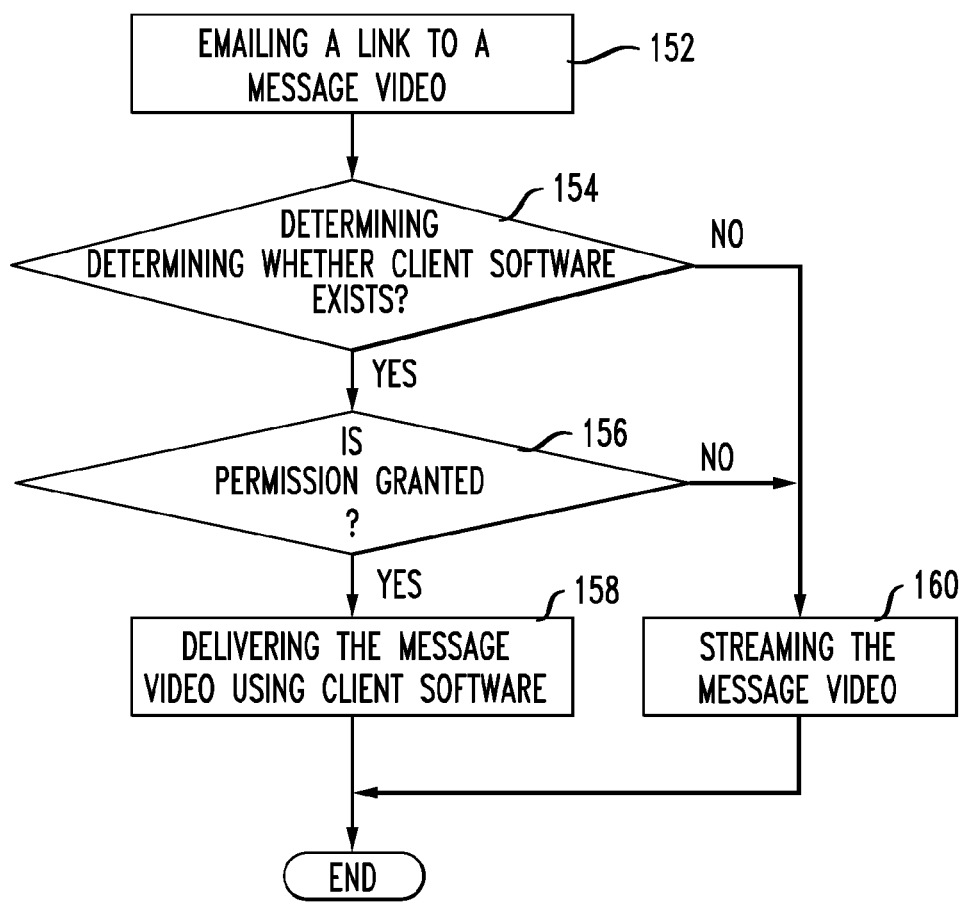

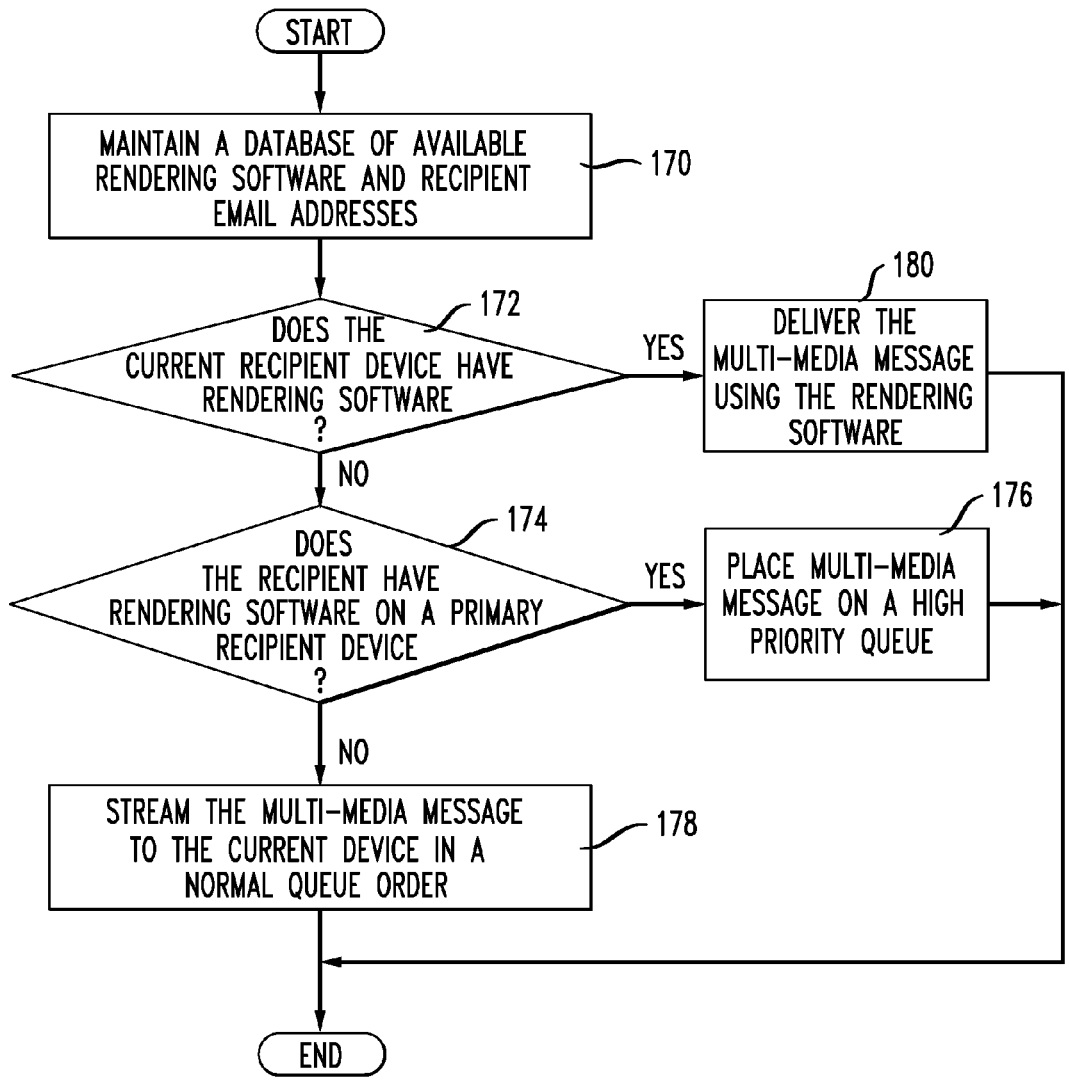

SYSTEM AND METHOD FOR RECEIVING MULTI-MEDIA MESSAGES

PRIORITY APPLICATION

The present application is a continuation of U.S. patent application Ser. No. 11/212,267, filed on Aug. 27, 2005, which is a continuation of U.S. Pat. No. 6,976,082, filed on Nov. 2, 2001, which claims the benefit of provisional U.S. Patent Application No. 60/245,521 filed Nov. 3, 2000, the contents of which are incorporated herein.

RELATED APPLICATIONS

The present application is related to the following U.S. patent applications: Ser. No. 10/003,094 entitled "System and Method for Sending Multi-Media Message With Customized Audio"; Ser. No. 10/003,350 entitled "System and Method for Sending Multi-Media Messages Using Emoticons"; Ser. No. 10/003,093 entitled "System and Method for Sending Multi-Media Messages Using Customizable Background Images"; Ser. No. 10/003,092 entitled "System and Method of Customizing Animated Entities for Use in a Multi-Media Communication Application"; Ser. No. 09/999,526 entitled "System and Method of Controlling Sound in a Multi-Media Communication Application"; Ser. No. 09/999,525 entitled "System and Method of Marketing Using a Multi-Media Communication System"; and Ser. No. 09/999,505 entitled "System and Method of Providing Multi-Cultural Multi-Media Messages." These applications, filed concurrently herewith and commonly assigned, are incorporated herein by reference.

BACKGROUND OF THE INVENTION

1. Field of the Invention

The present invention relates to multi-media messages and more specifically to a system and method of customizing the reception of multi-media messages.

2. Discussion of Related Art

There is a growing popularity for text-to-speech ("TTS") enabled systems that combine voice with a "talking head" or a computer-generated face that literally speaks to a person. Such systems improve user experience with a computer system by personalizing the exchange of information. Systems for converting text into speech are known in the art. For example, U.S. Pat. No. 6,173,263 B1 to Alistair Conkie, assigned to the assignee of the present invention, discloses a system and method of performing concatenative speech synthesis. The contents of this patent are incorporated herein by reference.

One example associated with the creation and delivery of e-mails using a TTS system is LifeFX™'s Facemail™. FIG. 1 illustrates how a sender creates a message using the LifeFX™ system. A window 10 presents fields for inserting the sender's e-mail address 12 and the recipient's e-mail address 14. Standard features such as control buttons 16 for previewing and delivering the multi-media message are provided. A standard subject line is also provided 18. The sender chooses from a variety of faces 20 to deliver the message. The currently chosen face 22 appears in the window 10 as well. The sender inserts the message text as with a traditional e-mail in a text area 24 and a box 26 below the text area gives illustrations of some of the available emoticons, explained further below.

This system enables a sender to write an e-mail and choose a talking head or "face" to deliver the e-mail. The recipient of the e-mail needs to download special TTS software in order to enable the "face" to deliver the message. The downloaded software converts the typewritten e-mail from the e-mail sender into audible words, and synchronizes the head and mouth movements of the talking head to match the audibly spoken words. Various algorithms and software may be used to provide the TTS function as well as the synchronization of the speech with the talking head. For example, the article, "Photo-realistic Talking-heads From Image Samples," by E. Cosatto and H. P. Graf, *IEEE Transactions on Multimedia*, September 2000, Vol. 2, Issue 3, pages 152-163, describes a system for creating a realistic model of a head that can be animated and lip-synched from phonetic transcripts of text. The contents of this article are incorporated herein by reference. Such systems, when combined with TTS synthesizers, generate video animations of talking heads that resemble people. One drawback of related systems is that the synthesized voice bears no resemblance to the sender voice.

The LifeFX™ system presents the user with a plurality of faces 20 from which to choose. Once a face is chosen, the e-mail sender composes an e-mail message. Within the e-mail, the sender inserts features to increase the emotion showed by the computer-generated face when the e-mail is "read" to the e-mail recipient. For example, the following will result in the message being read with a smile at the end: "Hi, how are you today? :-)". These indicators of emotion are called "emoticons" and may include such features as: :-( (frown); -o (wow); :-x (kiss); and ;-) (wink). The e-mail sender will type in these symbols which are translated by the system into the emotions. Therefore, after composing a message, inserting emoticons, and choosing a face, the sender sends the message. The recipient will get an e-mail with a notification that he or she has received a facemail and that they will need to download a player to hear the message.

The LifeFX™ system presents its emoticons when delivering the message in a particular way. For example, when an emoticon such as a smile is inserted in the sentence "Hi, Jonathon, :-) how are you today?" the "talking head" 22 speaks the words "Hi, Jonathan" and then stops talking and begins the smiling operation. After finishing the smile, the talking head completes the sentence "how are you today?"

The LifeFX™ system only enables the recipient to hear the message after downloading the appropriate software. There are several disadvantages to delivering multi-media messages in this manner. Such software requires a large amount of disc space and the recipient may not desire to utilize his or her space with the necessary software. Further, with viruses prevalent on the Internet, many people are naturally reluctant to download software when they are unfamiliar with its source.

FIG. 2 illustrates a received Facemail™ 40. The chosen talking head 22 delivers the message. Buttons such as "say again" 42, "new" 44, "forward" 26, "reply" 48, "reply all" 50, and "show text" 52 enable the recipient to control to some degree how the message is received. Buttons 42, 44, 46, 48 and 50 are commonly used button features for controlling messages. Button 52 allows the user to read the text of the message. When button 52 is clicked, the text of the message is shown in a window illustrated in FIG. 3. A separate window 54 pops up typically over the talking head 22 with the text. When the window is moved or does not cover the talking head, the sound continues but if the mouth of the talking head is showing, it is clear that when the text box is up, the mouth stops moving.

SUMMARY OF THE INVENTION

What is needed in the art is a system and method to enable more efficient and desirable control to a recipient of a multimedia message. Furthermore, what is needed is to enable a user who does not wish to download the software to nevertheless receive entertaining multi-media messages. The present invention addresses the deficiencies in the prior art where software must be downloaded to receive multi-media messages. The invention further relates to systems and methods associated with recipient control over the reception of multi-media messages.

One embodiment of the present invention relates to a system and method of delivering a multi-media message. The method relates to delivering a multi-media message to a recipient. Preferably, a sender creates the multi-media message that contains a talking entity that audibly delivers the message. The method comprises e-mailing to the recipient a message containing a link to the multi-media message, wherein the multi-media message is contained on a server. When the recipient clicks the link to the multi-media message, the method comprises determining whether a client terminal associated with the recipient contains client software to deliver the multi-media message and, if client software exists on the client terminal, determining whether permission is granted for delivering the multi-media message. If the client software exists on the client terminal and permission is granted, the method comprises delivering the multi-media message using the client software. If the client software does not exist on the client terminal or if the client software exists on the client terminal but permission is not granted to deliver the multi-media message, the method comprises streaming the multi-media message from a server such that a generic rendering software device will deliver the multi-media message.

In this manner, the multi-media message may be delivered in an optimal fashion wherein if a recipient previously downloaded client software to deliver multi-media messages, then the method will use that software. Otherwise, the method comprises streaming the multi-media message to a generic rendering program, such as a video player like Microsoft's Mediaplayer® or Realplayer®.

In another embodiment of the invention, the method relates to delivering a multi-media message to a recipient, the multi-media message being created by a sender and containing a talking entity for speaking a sender message using text-to-speech means. The method comprises transmitting to the recipient a message containing a link to the multi-media message, wherein the multi-media message is contained on a server and upon the recipient requesting the multi-media message, transmitting the multi-media message from the server in a first part and a second part. The first part comprises only the text of the sender message and the second part contains HTML code to present the multi-media message in a message window.

BRIEF DESCRIPTION OF THE DRAWINGS

The foregoing advantages of the present invention will be apparent from the following detailed description of several embodiments of the invention with reference to the corresponding accompanying drawings, of which:

FIG. 6 shows an example window for a sender to create a multi-media message;

FIG. 7 illustrates an example of a method for delivering a multi-media message to a recipient;

FIG. 8 illustrates another example of a method for delivering a multi-media message to a recipient;

FIG. 9 illustrates another example of a method for delivering a multi-media message where a client device capability is determined before delivering the multi-media message;

FIG. 10 shows another example of a method for delivering a multi-media message where a client device capability and delivery permissions are determined before delivering the multi-media message; and FIG. 11 shows another example of a method of delivering multi-media messages to a current recipient device that has different rendering software capability from the primary recipient device.

DETAILED DESCRIPTION OF THE INVENTION

The present invention may be best understood with reference to the accompanying drawings and description herein. The basic system design supporting the various embodiments of the invention is first disclosed. A system comprises a TTS and an animation server to provide a multi-media message service over the Internet wherein a sender can create a multi-media message presentation delivered audibly by an animated entity.

Figure 1:
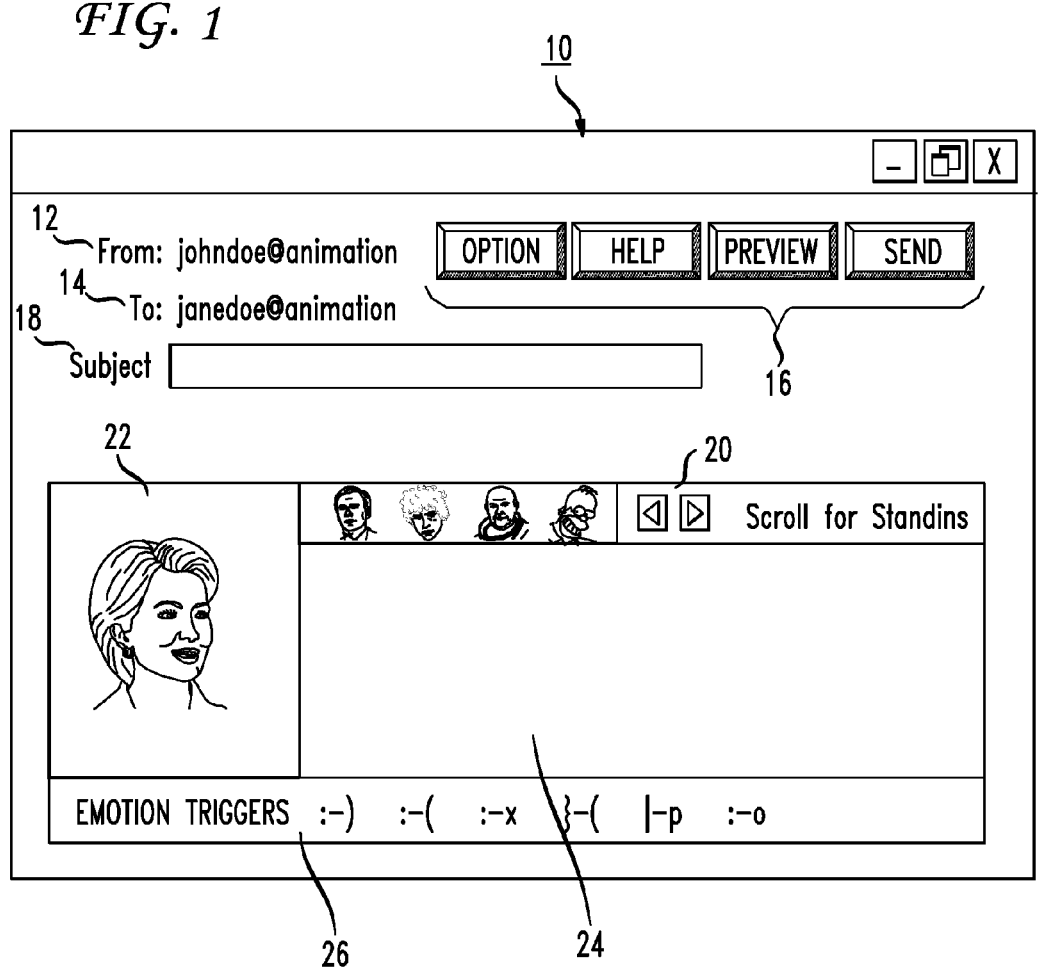
FIG. 1 illustrates a prior art window for creating a multi-media message.
Figure 2:
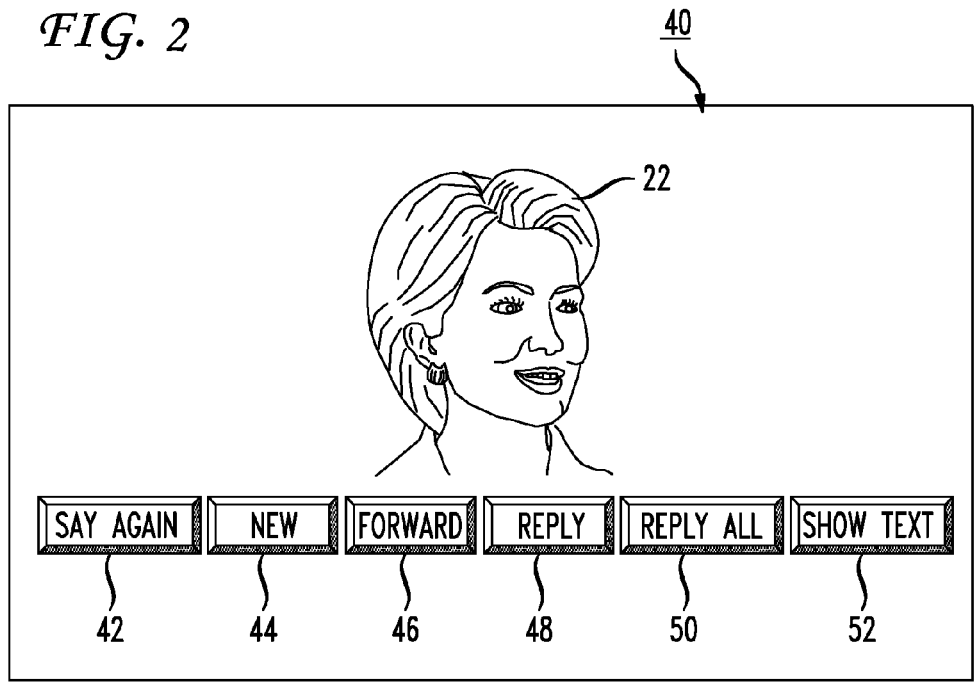
FIG. 2 illustrates a prior art window viewed by a recipient of a multi-media message.
Figure 3:
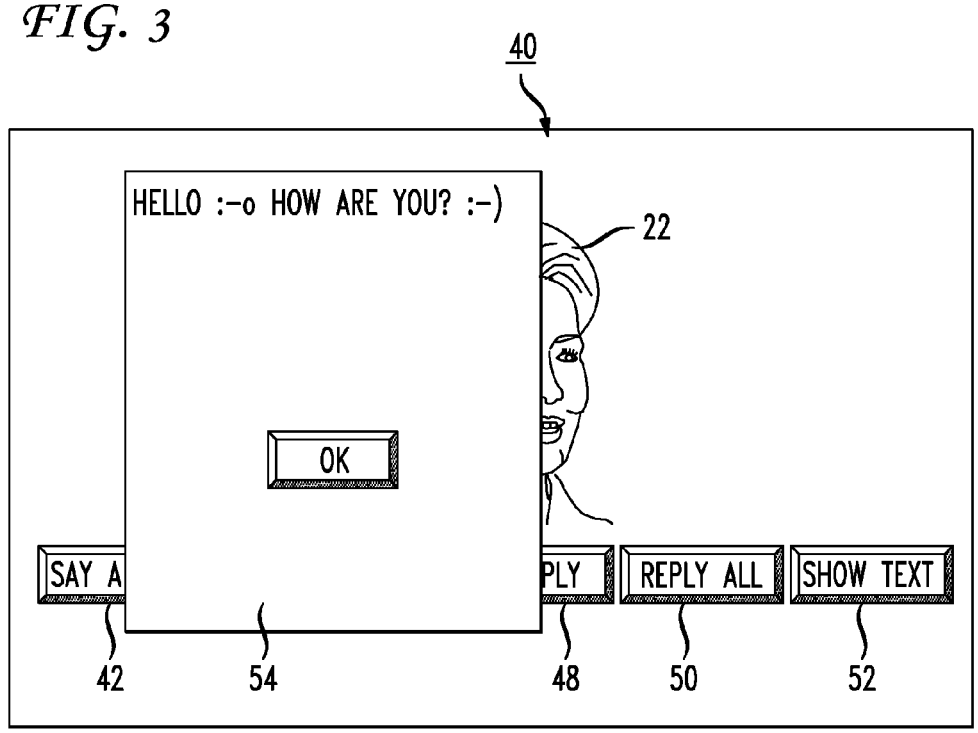
FIG. 3 illustrates a prior art window in response to a recipient of a multi-media message clicking on a "show text" button.
Figure 4A:
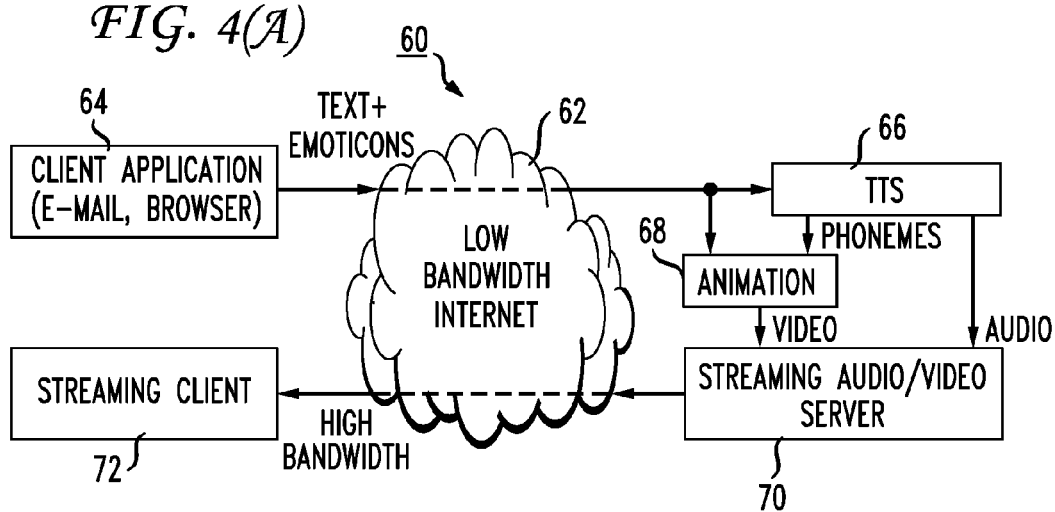
FIG. 4(a) illustrates the basic architecture of the system according to an embodiment of the present invention.

FIG. 4(a) illustrates a high-bandwidth architecture 60 associated with the embodiments of the invention. The system 60 delivers a hyper-text mark-up language (HTML) page through the Internet 62 (connected to a web server, not shown but embodied in the Internet 62) to a client application 64. The HTML page (shown by way of example in FIG. 6) enables the sender to create a multi-media message. The client application may be, for example, a web browser such as Microsoft's Internet Explorer®. Other client applications include e-mail and instant messaging clients. The sender creates the multi-media message using the HTML page.

The web server receives the composed multi-media message, which includes several components that are additional to a regular e-mail or instant message. For example, a multi-media message includes a designation of an animated entity for audibly delivering the message and emoticons that add emotional elements to the animated entity during the delivery of the message. The HTML page delivered to the client terminal enables the sender to manipulate various buttons and inputs to create the multi-media message.

Once the sender finishes creating the multi-media message and sends the message, the Internet 62 transmits the message text with emoticons and other chosen parameters to a text-to-speech (TTS) server 66 that communicates with an animation or face server 68 to compute and synchronize the multi-media message. The transmission of the text-to-speech data may be accomplished using such methods as those disclosed in U.S. Pat. No. 6,173,250 B1 to Kenneth Jong, assigned to the assignee of the present invention. The contents of this patent are incorporated herein by reference.

The animation server 68 receives phonemes associated with the sender message and interpreted by the TTS server 66, including the text of the subject line and other text such as the name of the sender, as well as other defined parameters or data. The animation server 68 processes the received phonemes, message text, emoticons and any other provided parameters such as background images or audio and creates an animated message that matches the audio and the emoticons. An exemplary method for producing the animated entity is disclosed in U.S. Pat. No. 5,995,119 to Cosatto et al. ("Cosatto et al."). The Cosatto et al. patent is assigned to the assignee of the present invention and its contents are incorporated herein by reference. Cosatto et al. disclose a system and method of generating animated characters that can "speak" or "talk" received text messages. Another reference for information on generating animated sequences of animated entities is found in U.S. Pat. No. 6,122,177 to Cosatto et al. ("Cosatto et al. II"). The contents of Cosatto et al. II are incorporated herein by reference as well.

Figure 4B:
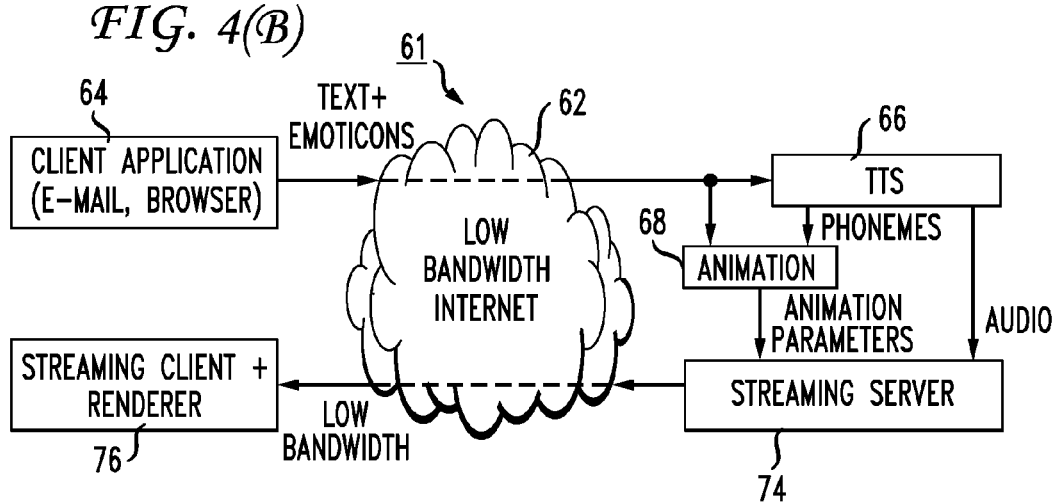
FIG. 4(b) illustrates a low-bandwidth version of the system shown in FIG. 4(a)

The system 60 encodes the audio and video portions of the multi-media message for streaming through a streaming audio/video server 70. In a high-bandwidth version of the present invention, as shown in FIG. 4(*a*), the server 70 streams the multi-media message to the streaming client 72 over the Internet 62. One of ordinary skill in the art will understand and be cognizant of a variety of TTS servers and TTS technologies that may be optimally used for converting the text to speech. The particular implementation of TTS technologies is not relevant to the present invention. One of ordinary skill in the art will understand and be cognizant of a variety of animation servers and animation technologies that may be optimally used for converting phonemes and emoticons into talking entities, preferably faces. The particular implementation of animation technologies is not relevant to the present invention.

FIG. 4(*b*) illustrates a low-bandwidth system 61 of the present invention. In this variation, the animation server 68 produces animation parameters that are synchronized with the audio produced from the TTS server 66. The audio and animation parameters are encoded and transmitted by the streaming server 74 over a lower bandwidth connection over the Internet 62. The streaming client 76 in this aspect of the invention differs from the streaming client 72 of FIG. 4(*a*) in that client 76 includes rendering software for rendering the animation on the client device using the streamed animation parameters provided from the streaming server 74. Furthermore, the client includes a TTS synthesizer that synthesizes the audio. In this manner, the systems disclosed in FIGS. 4(*a*) and 4(*b*) provide both a high-bandwidth and a low-bandwidth option for all users.

A further variation of the invention applies when the client device includes the animation or rendering software. In this case, the client device 72, 76 can receive a multi-media message e-mail, with the message declared as a specific multi-purpose Internet mail extension (MIME) type, and render the animation locally without requiring access to a central server or streaming server 70, 74. In one aspect of the invention, the rendering software includes a TTS synthesizer with the usable voices. In this case, the recipient device 72, 76 receives the text (very little data) and the face model (several kb), unless it is already stored in a cache at the receiver device 72, 76. If the receiver device 72, 76 is requested to synthesize a voice different from the ones available at its TTS synthesizer, the server 74 downloads the new voice.

High quality voices typically require several megabytes of disk space. Therefore, if the voice is stored on a streaming server 74, in order to avoid the delay of the huge download, the server 74 uses a TTS synthesizer to create the audio. Then, the server 74 streams the audio and related markup information such as phonemes, stress, word-boundaries, bookmarks with emoticons, and related timestamps to the recipient. The recipient device 76 locally renders the face model using the face model and the markup information and synchronously plays the audio streamed from the server.

Figure 5:
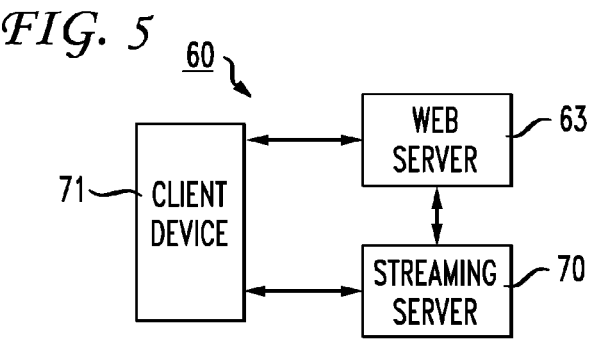
FIG. 5 shows example architecture for delivering the multi-media message.

When the recipient receives an e-mail message associated with the multi-media message, the message is received on a client device 71 such as that shown in FIG. 5. FIG. 5 illustrates a different view of system 60. The client device may be any one of a desktop, laptop computer, a wireless device such as a cell phone, 3Com's Palmpilot® or personal data assistant and the like. The particular arrangement of the client device 71 is unimportant to the present invention. The multi-media message may be delivered over the Internet, via a wireless communication system such as a cellular communication system or via a satellite communication system.

The multi-media message delivery mechanism is also not limited to an e-mail system. For example, other popular forms of communication include instant messaging, bulletin boards, I Seek You (ICQ) and other messaging services. Instant messaging and the like differ from regular e-mail in that its primary focus is immediate end-user delivery. In this sense, the sender and recipient essentially become interchangeable because the messages are communicated back and forth in real time. Presence information for a user with an open session to a well-known multi-user system enables friends and colleagues to instantly communicate messages back and forth. Those of skill in the art know various architectures for simple instant messaging and presence awareness/notification. Since the particular embodiment of the instant message, bulletin board, or I Seek You (ICQ) or other messaging service is not relevant to the general principles of the present invention, no further details are provided here. Those of skill in the art will understand and be able to apply the principles disclosed herein to the particular communication application. Although the best mode and preferred embodiment of the invention relates to the e-mail context, the multi-media messages may be created and delivered via any messaging context.

For instant messaging, client sessions are established using a multicast group (more than 2 participants) or unicast (2 participants). As part of the session description, each participant specifies the animated entity representing him. Each participant loads the animated entity of the other participants. When a participant sends a message as described for the e-mail application, this message is sent to a central server that animates the entity for the other participants to view or streams appropriate parameters (audio/animation parameters or audio/video or text/animation parameters or just text) to the participants that their client software uses to render the animated entity.

Further as shown in FIG. 5, when a client device 71 receives a request from the recipient to view a multi-media message, the client device 71 sends a hypertext transfer protocol (HTTP) message to the web server 63. As a response, the web server sends a message with an appropriate MIME type pointing to the server 70 at which point the server 70 streams the multi-media message to the client terminal for viewing and listening. This operation is well known to those of skill in the art.

In an alternate aspect of the invention, the client device 71 stores previously downloaded specific rendering software for delivering multi-media messages. As discussed above, LifeFX™ requires the recipient to download its client software before the recipient may view the message. Therefore, some of the functionality of the present invention is applied in the context of the client terminal 71 containing the necessary software for delivering the multi-media message. In this case, the animation server 68 and TTS server 66 create and synchronize the multi-media message for delivery. The multimedia message is then transmitted, preferably via e-mail, to the recipient. When the recipient opens the e-mail, an animated entity shown in the message delivery window delivers the message. The local client software runs to locally deliver the message using the animated entity.

Many web-based applications require client devices to download software on their machines, such as with the LifeFX™ system. As mentioned above, problems exist with this requirement since customers in general are reluctant and rightfully suspicious about downloading software over the Internet because of the well-known security problems such as virus contamination, trojan horses, zombies, etc. New software installations often cause problems with the existing software or hardware on the client device. Further, many users do not have the expertise to run the installation process if it gets even slightly complicated e.g., asking about system properties, directories, etc. Further, downloading and installing software takes time. These negative considerations may prevent hesitant users from downloading the software and using the service.

Some Java-based applications are proposed as a solution for the above-mentioned problems but these are more restrictive due to security precautions and can't be used to implement all applications and there is no unified Java implementation. Therefore, users need to configure their browsers to allow Java-based program execution. As with the problems discussed above, a time-consuming download of the Java executable for each use by users who do not know if they really need or like to use the new application may prevent users from bothering with the Java-based software.

Accordingly, an aspect of the present invention includes using streaming video to demonstrate the use of a new software application. Enabling the user to preview the use of a new software application solves the above-mentioned these problems for many applications. Currently, almost all client machines have a streaming video client such as Microsoft's Mediaplayer® or Real Player®. If not, such applications can be downloaded and configured with confidence. Note that the user needs to do this only once. These streaming video receivers can be used to receive and playback video on the client's machine.

According to this aspect of the present invention, shown by way of example in FIG. 5, a user may wish to preview a multi-media message before downloading rendering software on the client device 71. If such is the case, the user enters into a dialogue with the streaming server 70 and requests a preview or demonstration of the capabilities of the application if the rendering software were downloaded. The streaming server 70 transmits to the client device 71 a multi-media message showing dynamic screen shots of the application as if it is running on the user's machine. As an example, if the new application would have the capability to show a three-dimensional view of a room based on vector graphics, the streaming video displays the three-dimensional output of the application on the user's monitor as video. Most existing players allow the users to control the video playback by clicking on buttons or the like on an HTML page. This provides an interactive feeling for the user if needed without loading any new or suspicious software.

Therefore, an aspect of the present invention enables the user, before downloading rendering software for presenting multi-media messages using an animated entity, to request a preview of the multi-media message streamed to the client as a video and presented on a player such as the Microsoft Mediaplayer® or Real Player®. If the user so desires, he or she can then download the rendering software for enjoying the reception of multi-media messages.

Figure 6:
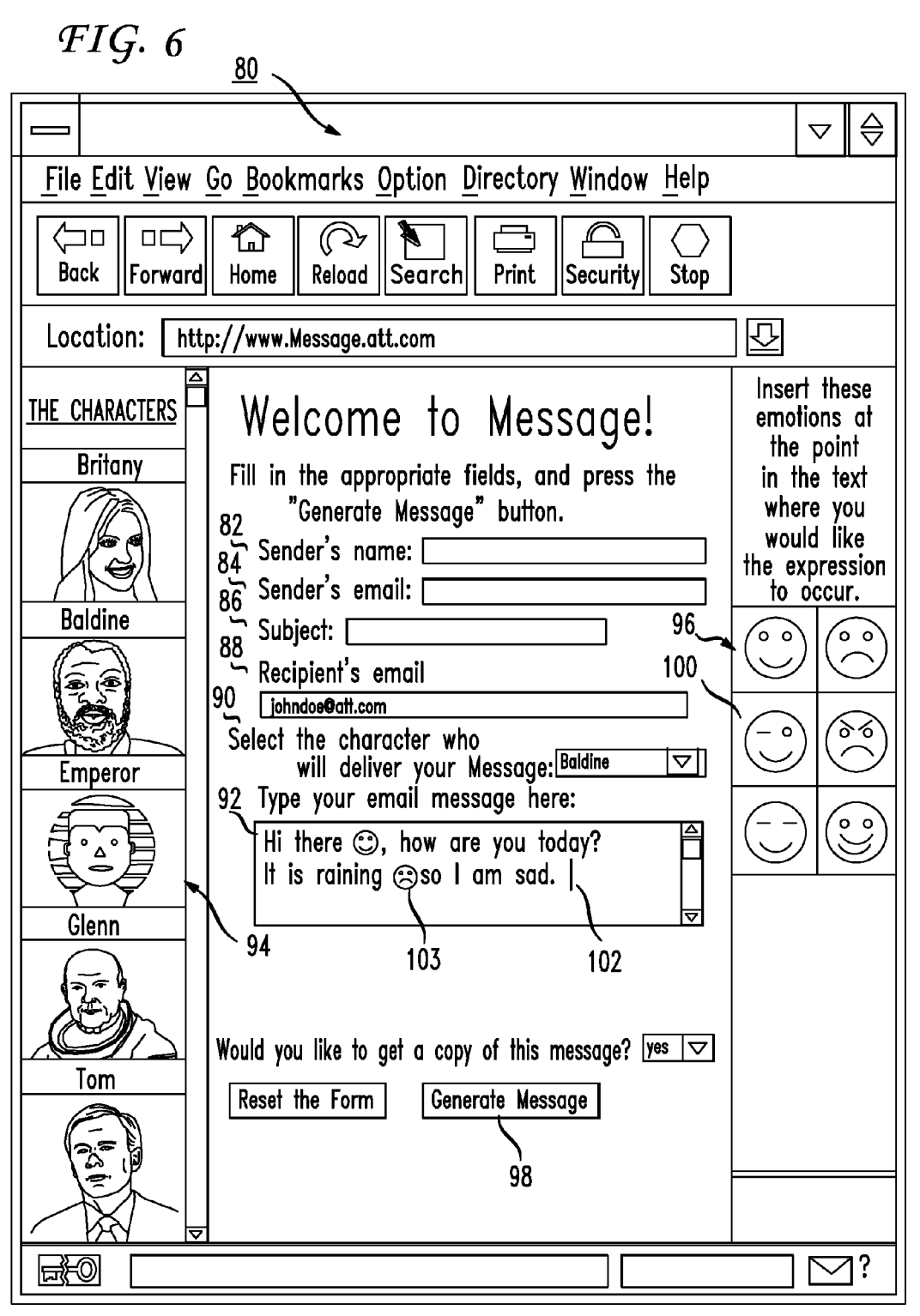

FIG. 6 shows an example of a template for the sender to use to create a multi-media message. A message-creation window 80 includes basic e-mail-related features such as fields for inserting a sender name 82 and sender e-mail address 84. A subject line 86 and recipient address field 88 are also provided. The sender enters the text of the message within a standard text field 92. Various animated entities 94 are available from which the sender may choose (90) for delivering the message. Typically the animated entities are faces as shown in FIG. 6, but they may be any entity such as an animal, car, tree, robot, or anything that may be animated.

The sender may also insert emoticons 103 into the text of the message. The system includes predefined emoticons 96, such as ":-)" for a smile, "::-)" for a head nod, "*w*" for an eye wink, and so forth. The predefined emoticons are represented either as icons or as text, such as ";-)". As shown in FIG. 6, the window 80 includes a sample group of emoticon icons 96. The sender inserts an emoticon into a text message at the location of the cursor 102 by clicking on one of the emoticon icons 100. The sender may also type in the desired emoticon as text. Emoticon icons 96 save the sender from needing to type three keys, such as ":" and "-" and ")" for a smile. The icons 96 may be either a picture of, say, a winking eye or a icon representation of the characters ";-)" 100, or other information indicating to the sender that clicking on that emoticon icon will insert the associated emotion 103 into the text at the location of the cursor 102.

Once the sender composes the text of the message, chooses an animated entity 94, and inserts the desired emoticons 103, he or she generates the multi-media message by clicking on the generate message button 98. The animation server 68 creates an animated video of the selected animated entity 94 for audibly delivering the message. The TTS server 66 converts the text to speech as mentioned above. Emoticons 103 in the message are translated into their corresponding facial expressions such as smiles and nods. The position of an emoticon 103 in the text determines when the facial expression is executed during delivery of the message.

Execution of a particular expression preferably occurs before the specific location of the emoticon in the text. This is in contrast to the LifeFX™ system, discussed above, in which the execution of the smile emoticon in the text "Hello, Jonathan :-) how are you?" starts and ends between the words "Jonathan" and "how". In the present invention, the expression of the emoticon begins a predefined number of words or a predefined time before the emoticon's location in the text. Furthermore, the end of the expressions of an emoticon may be a predefined number of words after the location of the emoticon in the text or a predetermined amount of time after the location of the emoticon.

For example, according to an aspect of the present invention, the smile in the sentence "Hello, Jonathan :-) how are you?" will begin after the word "Hello" and continue through the word "how" or even through the entire sentence. The animated entity in this case will be smiling while delivering most of the message—which is more natural for the recipient than having the animated entity pause while executing an expression.

Furthermore, the starting and stopping points for executing expressions will vary depending on the expression. For example, a wink typically takes a very short amount of time to perform whereas a smile may last longer. Therefore, the starting and stopping points for a wink may be defined in terms of 0.1 seconds before its location in the text to 0.5 seconds after the location of the wink emoticon in the text. In contrast, the smile emoticon's starting, stopping, and duration parameters may be defined in terms of the words surrounding the emoticons.

The first embodiment of the invention is illustrated in FIG. 7. FIG. 7 shows an example of a method for delivering a multi-media message to a recipient, the multi-media message having been created by a sender and containing a talking entity that delivers a text message using text-to-speech means. Before the steps of the method are executed, the sender selects an animated entity to deliver the message, and the message is transmitted to a web server. As discussed above, a face or animation server and a TTS server compose the message and transmit the multi-media message to an encoder. The encoder encodes the multi-media message in preparation for streaming and transmits the multi-media message to a recipient device.

As shown in FIG. 7, the method comprises receiving the message from the sender (102). Typically the message will include the necessary data associated with the text of the message typed by the sender and the choice of animated entity for delivering the message. The multi-media message is composed (104) using the text message and chosen talking entity. The composition of the multi-media message requires a synchronization of the audio TTS synthesized speech and the movements of the animated entity such that it appears to the recipient that the animated entity is speaking the message. The composed multi-media message is stored on a server. Finally, the method comprises transmitting to the recipient a message containing a link to the multi-media message (106). The method according to this aspect of the invention further comprises streaming the multi-media message to the recipient from the server in response to a recipient action such as clicking on a link to the server containing the multi-media message (108). The message may also contain a separate link to the text of the message composed by the sender of the multi-media message. The separate link to the text enables the recipient to receive the text directly for viewing, storage or printing as desired. The link may be the URL of the desired multi-media message or text message or some other link to the information such as a video plug-in.

In another aspect of the second embodiment, the step of transmitting a message with a link (106) further comprises transmitting the multi-media message from the web server in a first part and a second part, wherein the first part comprises only the text of the message and the second part contains HTML code to present the multi-media message in a message window. The message may also contain information regarding the sender such as the name of the sender, and the date the message was sent.

The message transmitted to the recipient may be transmitted via an e-mail message or some other form of communication such as an instant message or wireless message.

In yet another aspect of the first embodiment of this invention, there is disclosed in FIG. 8 a method of delivering a multi-media message to a recipient, wherein transmitting the message includes transmitting a link to the multi-media message and further comprises maintaining at a server a database of recipient e-mail addresses and available rendering software associated with each e-mail address (120). Upon receiving a multi-media message from a sender to a recipient and using the database, the method comprises determining whether the recipient has available rendering software for delivering the multi-media message (122) and, if the recipient has available rendering software, delivering the multi-media message using the rendering software (124). If the recipient does not have available rendering software, the method comprises streaming the multi-media message from the server such that a generic rendering software device will deliver the multi-media message (126).

Regardless of the determination whether or not the recipient has available rendering software for delivering the multi-media message, it is preferable that the recipient is presented with an option to receive a streaming multi-media message from the server. An example of rendering software includes the LifeFX™ software available for downloading from the Internet.

In another aspect of the invention, a high-priority queue and a low-priority queue are established to deliver multi-media messages wherein, if the recipient has available rendering software, the multi-media message destined for the recipient is placed in a low-priority queue. If the recipient does not have the available software, then the multi-media message is placed in a high-priority queue. Such a queue may be maintained at one of the system servers discussed above.

In another aspect of the invention, a method of delivering a multi-media message to a recipient associated with a client device is disclosed in FIG. 9. The multi-media message previously created by a sender is associated with an animated entity for delivering a text message using text-to-speech means. The method comprises transmitting to the recipient a message containing a link to the multi-media message, wherein the multi-media message is contained on a server (140). The transmitting step may be in the form of e-mail, instant messaging, or other communication means. Next, a script is transmitted that explores the client device capabilities (142). Many client terminals may be used to receive multi-media messages. There are differences between various client terminals in parameters that will affect the reception of multi-media messages. Such parameters include screen size, screen capability, processing power, memory capabilities, bandwidth of network connection, color or black and white screen. More details of parameters determining the client capabilities are described in U.S. patent application Ser. No. 09/113,747 entitled "Interaction Modalities for Multimedia Delivery and Presentation Using Nodes", filed on Jul. 15, 1997. The contents of this patent application are incorporated herein by reference. Step 142 of the method involves querying to ascertain the kind of client terminal to which the multi-media message is being delivered. Finally, the method comprises delivering the multi-media message wherein the multi-media message is tailored to the client device (144).

The method shown in FIG. 9 of delivering a multi-media message to a client device, wherein the multi-media message is tailored to the specific client device capabilities, may be modified further by delivering only an audio portion of the multi-media message. This aspect of the second embodiment of the invention relates to client devices such as handheld computing devices with smaller screens and smaller processing power for handling streaming video.

In another aspect of the second embodiment of the invention, FIG. 10 illustrates a method of delivering a multi-media message to a recipient, the multi-media message being created by a sender and containing a talking entity for speaking a sender message using text-to-speech means. The method comprises e-mailing to the recipient a message containing a link to the multi-media message, wherein the multi-media message is contained on a server (152). Upon the recipient clicking the link to the multi-media message, the method comprises determining whether a client terminal associated with the recipient contains client software to deliver the multi-media message (154). If client software exists on the client terminal, the method determines whether permission is granted for delivering the multi-media message (156). If client software exists on the client terminal and permission is granted, the method comprises delivering the multi-media message using the client software (158). If the client software does not exist on the client terminal or if the client software exists on the client terminal but permission is not granted to deliver the multi-media message, the multi-media message is streamed from a server such that a generic rendering software device like a video player will deliver the multi-media message (160).

In another aspect of the invention, the method for delivering a multi-media message to a recipient relates to delivering streaming audio while the video is rendered locally. The method comprises determining whether the recipient device has speech synthesis software for delivering an audio portion of the multi-media message. If the recipient has speech synthesis software, a voice is synthesized for delivering the multi-media message at the recipient device. If the recipient does not have the speech synthesis software, audio is synthesized at a server and streamed to the recipient jointly with the delivery of a video portion of the multi-media message.

The method may further comprise determining whether the recipient device has rendering software for delivering a video portion of the multi-media message and, if the recipient does not have rendering software, streaming the multi-media message from the server such that a generic rendering software device will deliver the multi-media message.

In another aspect of the invention, the method comprises determining whether the recipient device has speech synthesis software associated with a voice requested by the sender. In this regard the sender may select from a plurality of voices to deliver a message. The recipient device may have rendering software for locally synthesizing a sub-group of the plurality of voices. Therefore, a determination must be made first if the recipient device includes the audio rendering software and whether the sender-selected voice is included in the voices capable of being rendered on the recipient device. If the recipient does not have the speech synthesis software, the method comprises synthesizing audio at the server and streaming the audio to the recipient jointly with the available rendering software. However, if the recipient does have the speech synthesis software and the requested voice is available locally, the method comprises synthesizing the voice at the recipient's device and delivering the voice jointly with the available rendering software. If the speech synthesis software is on the recipient device but the requested voice is unavailable, the method comprises synthesizing the voice at the recipient device and delivering the voice jointly with the available rendering software.

In a variation on the above method, if the recipient does have the speech synthesis software and the requested voice is available, the method may comprise creating an intermediate representation of the voice at the server that the speech synthesis software uses to render the requested voice.

Another aspect of the invention is shown in FIG. 11 and relates to providing the recipient with top quality delivery service of the multi-media message when the recipient may move from a primary recipient device to a secondary or current recipient device. Often, a recipient may be able to log onto a different computer device that does not contain rendering software that is downloaded on the recipient's primary device. In this case, the present invention provides for a method of delivering the multi-media message to the recipient by maintaining a database of recipient e-mail addresses and available rendering software on a primary recipient device associated with each e-mail address (170). Upon receiving a multi-media message from a sender to a recipient, the method comprises determining whether a current recipient device has rendering software for delivering the multi-media message (172). If the current device has the rendering software, then the multi-media message is delivered using the rendering software (180).

If the current recipient device does not have rendering software, the method comprises determining whether the recipient's primary device contains the rendering software (174). This is accomplished via a query to the database maintained in step 170. If the recipient's primary device contains the rendering software, then the system knows that the recipient is accustomed to high quality service and chose to download the software to achieve such service. Accordingly, for such recipients, the method further comprises placing their multi-media message in a high-priority queue (176) such that they will receive their message with the highest quality service possible when the current recipient device does not have the rendering software. If the recipient does not have the rendering software on his or her primary device, then the multi-media message is streamed to the recipient according to a standard queue order (178). In this manner, recipients that are used to receiving multi-media messages at a higher service level as that available by downloading rendering software will experience a similar level of service when accessing multi-media messages from devices different from their primary computing device.

Although the above description may contain specific details, they should not be construed as limiting the claims in any way. Other configurations of the described embodiments of the invention are part of the scope of this invention. For example, the above embodiments are described preferably as being associated with e-mail technology. However, other messaging technologies that are capable of providing an animated entity are also contemplated as within the scope of this invention. Therefore, such communication means as instant messaging or wireless communication means are contemplated as relevant and as contexts wherein the present invention may be practiced. Accordingly, the appended claims and their legal equivalents should only define the invention, rather than any specific examples given.

We claim as our invention:

1. A system comprising:
   at least one server configured:
   to receive information corresponding to a multi-media message sent from a client device of a sender via a network;
   to stream the multi-media message to a second client device for presentation to a recipient;
   to determine whether the second client device has rendering software for delivering a video portion of the multi-media message;
   if the at least one server determines that the second client device does not have the rendering software, to stream the multi-media message from the at least one server such that a generic rendering software will deliver the multi-media message;
   to determine whether the second client device includes the rendering software for delivering a video portion of the multi-media message, wherein if the at least one server determines that the second client device does not include the rendering software, the at least one server is configured to stream the multi-media message from the at least one server such that the generic rendering software will deliver the multi-media message; and
   to determine whether the second client device includes speech synthesis software associated with a voice requested by the sender, wherein:

if the at least one server determines that the second client device does not include the speech synthesis software, the at least one server is configured to synthesize audio and stream the audio to the second client device;

if the at least one server determines that the second client device includes the speech synthesis software and the voice requested by the sender is available, the at least one server is configured to deliver data for voice synthesis to the second client device, the voice requested by the sender to be synthesized at the second client device; and if the at least one server determines that the second client device includes the speech synthesis software but the voice requested by the sender is not available, the at least one server is configured to download the voice to the second client device for the second client device to synthesize the voice.

2. A method of delivering a multi-media message to a recipient, the multi-media message being created by a sender and comprising a talking entity delivering the multi-media message, the method comprising:

determining, based at least on a database of recipient email addresses, whether a recipient device has speech synthesis software for delivering an audio portion of the multi-media message;

if the recipient device has speech synthesis software, synthesizing a voice for delivering the multi-media message at the recipient device; and if the recipient device does not have the speech synthesis software, synthesizing audio at at least one server to yield synthesized audio and streaming the synthesized audio to the recipient device jointly with delivery of a video portion of the multi-media message, wherein the at least one server is further configured:

if the at least one server determines that the client device does not have the speech synthesis software, to synthesize audio at the at least one server and stream the audio to the recipient jointly with available rendering software;

if the at least one server determines that the client device has the speech synthesis software and a requested voice is available, to create an intermediate representation of the voice at the at least one server; and if the at least one server determines that the client device has the speech synthesis software and the requested voice is not available, to synthesize the voice at the at least one server and stream the voice jointly with video rendered from the available rendering software.

3. A non-transitory machine-readable medium having instructions recorded thereon for at least one processor, the non-transitory machine-readable medium comprising:

instructions for determining whether a recipient device has rendering software for delivering a video portion of a multi-media message;

instructions for streaming the multi-media message from a server such that a generic rendering software will deliver the multi-media message if the recipient device does not have the rendering software, wherein the instructions for determining whether the recipient device has the rendering software further comprise:

instructions for maintaining a database of recipient e-mail addresses and available rendering software associated with each e-mail address:

instructions for determining whether the recipient device has the rendering software for delivering the multi-media message upon receiving the multi-media message and using the database of recipient email addresses; and instructions for presenting a recipient with an option to receive a streaming multi-media message from the server regardless of whether the recipient device has the rendering software for delivering the multi-media message, wherein a high-priority queue and a low-priority queue are used to deliver multi-media messages; and instructions for placing the multi-media message destined for the recipient on the low priority queue if the recipient has the rendering software.

4. A non-transitory machine-readable medium having instructions recorded thereon for at least one processor, the non-transitory machine-readable medium comprising:

instructions for determining whether a recipient device has rendering software for delivering a video portion of a multi-media message; and instructions for streaming the multi-media message from a server such that a generic rendering software device will deliver the multi-media message if the recipient device does not have the rendering software, wherein the instructions for determining whether the recipient device has the rendering software further comprise:

instructions for maintaining a database of recipient e-mail addresses and available rendering software associated with each e-mail address; and instructions for determining whether the recipient device has the rendering software for delivering the multi-media message upon receiving the multi-media message and using the database of recipient email addresses;

instructions for presenting a recipient with an option to receive a streaming multi-media message from the server regardless of whether the recipient device has the rendering software for delivering the multi-media message; and instructions for placing the multi-media message in a high-priority queue if the recipient device does not have the rendering software.

5. A non-transitory machine-readable medium having instructions recorded thereon for at least one processor, the non-transitory machine-readable medium comprising:

instructions for determining whether a recipient device has rendering software for delivering a video portion of a multi-media message; and instructions for streaming the multi-media message from a server such that a generic rendering software device will deliver the multi-media message if the recipient device does not have the rendering software, wherein the instructions for determining whether the recipient device has the rendering software further comprise:

instructions for maintaining a database of recipient e-mail addresses and available rendering software associated with each e-mail address; and instructions for determining whether the recipient device has the rendering software for delivering the multi-media message upon receiving the multi-media message and using the database of recipient email addresses;

instructions for presenting a recipient with an option to receive a streaming multi-media message from the server regardless of the determination of whether the recipient device has the rendering software for delivering the multi-media message; and instructions for placing the multi-media message on a very high-priority queue as soon as the recipient tries to access the multi-media message if the recipient device has the rendering software, but the rendering software is unavailable due to a different message access device.

* * * * *